US007000691B1

(12) United States Patent
Weber

(10) Patent No.: US 7,000,691 B1
(45) Date of Patent: Feb. 21, 2006

(54) METHOD AND APPARATUS FOR COOLING WITH COOLANT AT A SUBAMBIENT PRESSURE

(75) Inventor: Richard M. Weber, Prosper, TX (US)

(73) Assignee: Raytheon Company, Waltham, MA (US)

( * ) Notice: Subject to any disclaimer, the term of this patent is extended or adjusted under 35 U.S.C. 154(b) by 28 days.

(21) Appl. No.: 10/192,891

(22) Filed: Jul. 11, 2002

(51) Int. Cl.
*G05D 16/00* (2006.01)
*F28F 27/00* (2006.01)

(52) U.S. Cl. ........................ 165/281; 165/201; 165/60; 165/96; 165/911; 62/119

(58) Field of Classification Search ................ 165/281, 165/201, 48.1, 58, 96, 60, 911, 913, 80.2, 165/80.4, 80.3, 104.21, 104.19; 62/259.1, 62/259.2, 238.1, 119
See application file for complete search history.

(56) References Cited

U.S. PATENT DOCUMENTS 2,321,964 A 6/1943 Zieber
3,131,548 A 5/1964 Chubb et al.
3,174,540 A * 3/1965 Dutton ................... 165/913 X
3,371,298 A 2/1968 Narbut
3,586,101 A 6/1971 Chu ........................... 165/101
3,609,991 A 10/1971 Chu et al.
3,756,903 A 9/1973 Jones
3,774,677 A 11/1973 Antonetti et al. ........... 165/285
3,989,102 A 11/1976 Jaster et al. ................ 165/107
4,003,213 A 1/1977 Cox ............................ 62/124
4,019,098 A 4/1977 McCready et al. ......... 361/385
4,330,033 A 5/1982 Okada et al. .......... 165/104.27
4,381,817 A * 5/1983 Brigida et al. .......... 165/911 X
4,495,988 A * 1/1985 Grossman ............... 165/911 X
4,511,376 A 4/1985 Coury ........................... 55/36
4,794,984 A * 1/1989 Lin ........................ 165/911 X
4,851,856 A 7/1989 Altoz (Continued)

FOREIGN PATENT DOCUMENTS

DE 1220952 3/1968

(Continued)

OTHER PUBLICATIONS

U.S. Appl. No. 10/440,716 filed May 19, 2003 by inventors William Gerald Wyatt and Richard M. Weber for "Method and Apparatus for Extracting Non-Condensable Gases in a Cooling System", 21 pages of text and 1 drawing sheet.

(Continued)

*Primary Examiner*—Ljiljana Ciric
(74) *Attorney, Agent, or Firm*—Baker Botts L.L.P.

(57) ABSTRACT

An apparatus includes heat-generating structure disposed in an environment having an ambient pressure, and a cooling system for removing heat from the heat-generating structure. The cooling system includes a fluid coolant, structure which reduces a pressure of the coolant to a subambient pressure at which the coolant has a boiling temperature less than a temperature of the heat-generating structure; and structure which directs a flow of the liquid coolant at the subambient pressure so that it is brought into thermal communication with the heat-generating structure, the coolant then absorbing heat and changing to a vapor. A method for cooling heat-generating structure disposed in an environment having an ambient pressure includes providing a fluid coolant and reducing a pressure of the coolant to a subambient pressure at which the coolant has a boiling temperature less than a temperature of the heat-generating structure. The method also includes bringing the coolant at the subambient pressure into thermal communication with the heat-generating structure, so that the coolant boils and vaporizes to thereby absorb heat from the heat-generating structure.

11 Claims, 2 Drawing Sheets

U.S. PATENT DOCUMENTS

| | | | | |
|---|---|---|---|---|
| 4,938,280 | A | 7/1990 | Clark | 165/80.4 |
| 4,945,980 | A | 8/1990 | Umezawa | 165/101 |
| 4,998,181 | A | 3/1991 | Haws et al. | 361/385 |
| 5,128,689 | A | 7/1992 | Wong et al. | |
| 5,148,859 | A * | 9/1992 | Beamer | 165/911 X |
| 5,161,610 | A * | 11/1992 | Leidinger | 165/911 X |
| 5,168,919 | A | 12/1992 | Berenholz et al. | |
| 5,239,443 | A | 8/1993 | Fahey et al. | 361/689 |
| 5,261,246 | A | 11/1993 | Blackmon et al. | 62/85 |
| 5,333,677 | A | 8/1994 | Molivadas | 165/32 |
| 5,493,305 | A | 2/1996 | Wooldridge et al. | |
| 5,501,082 | A | 3/1996 | Tachibana et al. | 62/149 |
| 5,515,690 | A | 5/1996 | Blackmon et al. | 62/85 |
| 5,818,692 | A | 10/1998 | Denney, Jr. et al. | 361/699 |
| 5,841,564 | A | 11/1998 | McDunn et al. | 359/161 |
| 5,910,160 | A | 6/1999 | Cakmakci et al. | 62/195 |
| 5,943,211 | A | 8/1999 | Havey et al. | 361/699 |
| 5,960,861 | A | 10/1999 | Price et al. | 165/80.03 |
| 6,018,192 | A | 1/2000 | Root et al. | 257/714 |
| 6,055,154 | A | 4/2000 | Azar | 361/688 |
| 6,292,364 | B1 | 9/2001 | Fitzgerald et al. | 361/699 |
| 6,297,775 | B1 | 10/2001 | Haws et al. | |
| 6,498,725 | B1 | 12/2002 | Cole et al. | |
| 6,519,955 | B1 | 2/2003 | Marsala | 62/119 |
| 6,679,081 | B1 | 1/2004 | Marsala | 62/259 |
| 2003/0053298 | A1 | 3/2003 | Yamada et al. | 361/728 |

FOREIGN PATENT DOCUMENTS

| | | | |
|---|---|---|---|
| EP | 0 243 239 | A2 | 4/1987 |
| EP | 02 51 836 | A1 | 5/1987 |
| EP | 0 817 263 | A2 | 10/1991 |
| EP | 1 143 778 | A1 | 3/2001 |
| EP | 1 380 799 | A2 | 5/2003 |
| WO | WO 00/65890 | | 2/2000 |
| WO | WO 02/23966 | A2 | 3/2002 |

OTHER PUBLICATIONS

U.S. Appl. No. 10/193,571, filed Jul. 11, 2002, entitled "Method and Apparatus for Removing Heat from a Circuit", 33 pages of text and 3 pages of drawings.

EPO Search Report dated Nov. 3, 2004 for Patent No. 03254285.4-2301; Reference No. JL3847.

EPO Search Report dated Oct. 25, 2004 for Patent No. 03254283.9-2203; Reference No. JL3846.

PCT Notification of Transmittal of The International Search Report or the Declaration dated Sep. 27, 2004 for PCT/US2004/015086.

Dirk Van Orshoven, "*The use of water as a refrigerant—an exploratory investigation*", Thesis at the University of Wisconsin-Madison, XP-002121470 (pp. I, III-XIII, pp. -114) 1991.

Margaret Ingels, "(pp. 59 and 80 of *Willis Haviland Carrier Father of Air Conditioning*", Country Life Press—Garden City (1952).

U.S. Appl. No. 10/853,038 filed May 25, 2004 by inventors Richard M. Weber, et al. for "Method and Apparatus for Controlling Cooling with Coolant at a Subambient Pressure" 25 pages of text and 4 drawing sheets.

Yamada et al., "*Subcooled Flow Boiling With Flow Pattern*", USPGPUB 2003/0053298 A1; (pp. 1-3); Mar. 19,. 2002.

* cited by examiner

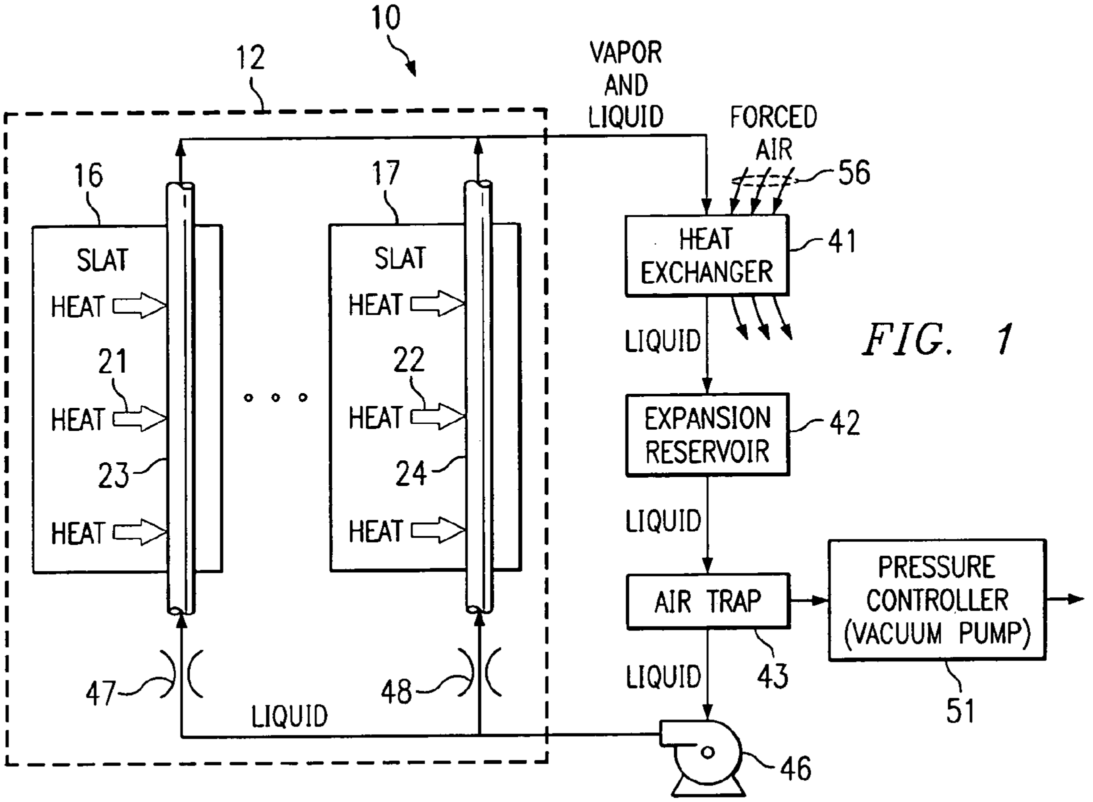
FIG. 1
FIG. 2
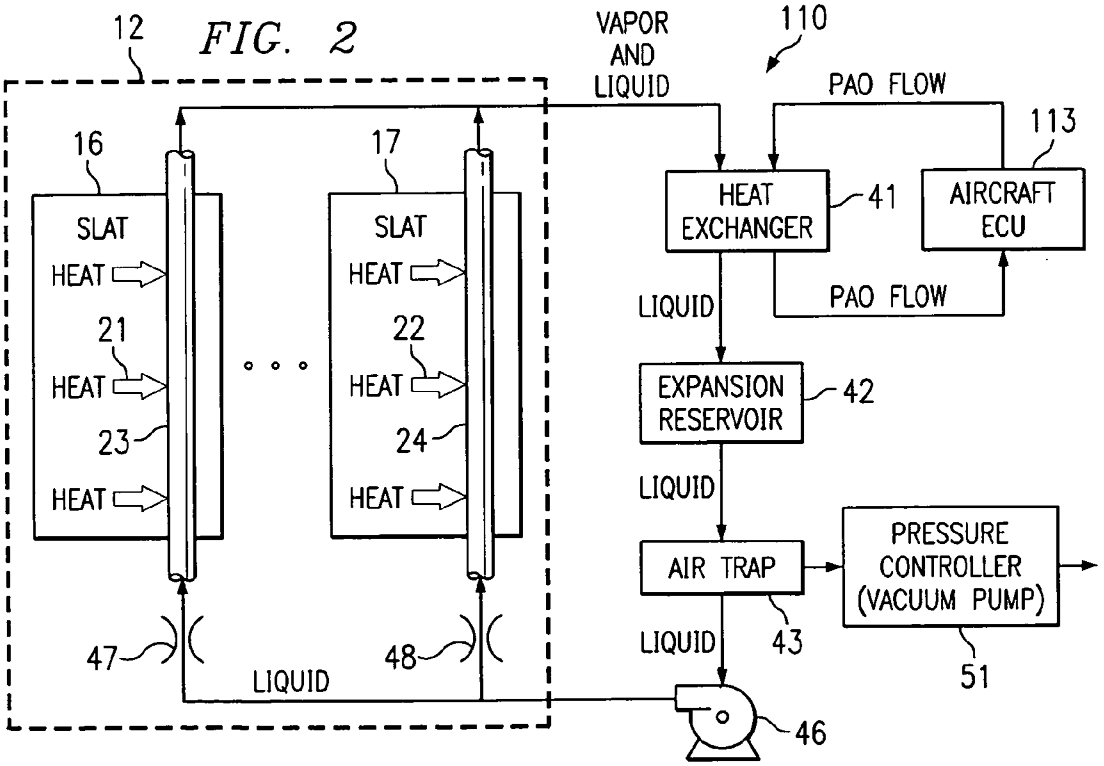

METHOD AND APPARATUS FOR COOLING WITH COOLANT AT A SUBAMBIENT PRESSURE

TECHNICAL FIELD OF THE INVENTION

This invention relates in general to cooling techniques and, more particularly, to a method and apparatus for cooling a system which generates a substantial amount of heat.

BACKGROUND OF THE INVENTION

Some types of electronic circuits use relatively little power, and produce little heat. Circuits of this type can usually be cooled satisfactorily through a passive approach, such as convection cooling. In contrast, there are other circuits which consume large amounts of power, and produce large amounts of heat. One example is the circuitry used in a phased array antenna system.

More specifically, a modern phased array antenna system can easily produce 25 to 30 kilowatts of heat, or even more. One known approach for cooling this circuitry is to incorporate a refrigeration unit into the antenna system. However, suitable refrigeration units are large, heavy, and consume many kilowatts of power in order to provide adequate cooling. For example, a typical refrigeration unit may weigh about 200 pounds, and may consume about 25 to 30 kilowatts of power in order to provide about 25 to 30 kilowatts of cooling. Although refrigeration units of this type have been generally adequate for their intended purposes, they have not been satisfactory in all respects.

In this regard, the size, weight and power consumption characteristics of these known refrigeration systems are all significantly larger than desirable for an apparatus such as a phased array antenna system. And given that there is an industry trend toward even greater power consumption and heat dissipation in phased array antenna systems, continued use of refrigeration-based cooling systems would involve refrigeration systems with even greater size, weight and power consumption, which is undesirable.

SUMMARY OF THE INVENTION

From the foregoing, it may be appreciated that a need has arisen for a method and apparatus for efficiently cooling arrangements that generate substantial heat. According to the present invention, a method and apparatus are provided to address this need, and involve cooling of heat-generating structure disposed in an environment having an ambient pressure by: providing a fluid coolant; reducing a pressure of the coolant to a subambient pressure at which the coolant has a boiling temperature less than a temperature of the heat-generating structure; and bringing the coolant at the subambient pressure into thermal communication with the heat-generating structure, so that the coolant boils and vaporizes to thereby absorb heat from the heat-generating structure.

BRIEF DESCRIPTION OF THE DRAWINGS

A better understanding of the present invention will be realized from the detailed description which follows, taken in conjunction with the accompanying drawings, in which:

FIG. 1 is a block diagram of an apparatus which includes a phased array antenna system and an associated cooling arrangement that embodies aspects of the present invention;

FIG. 2 is a block diagram similar to FIG. 1, but showing an apparatus which is an alternative embodiment of the apparatus of FIG. 1.

DETAILED DESCRIPTION OF THE INVENTION

Figure 3:
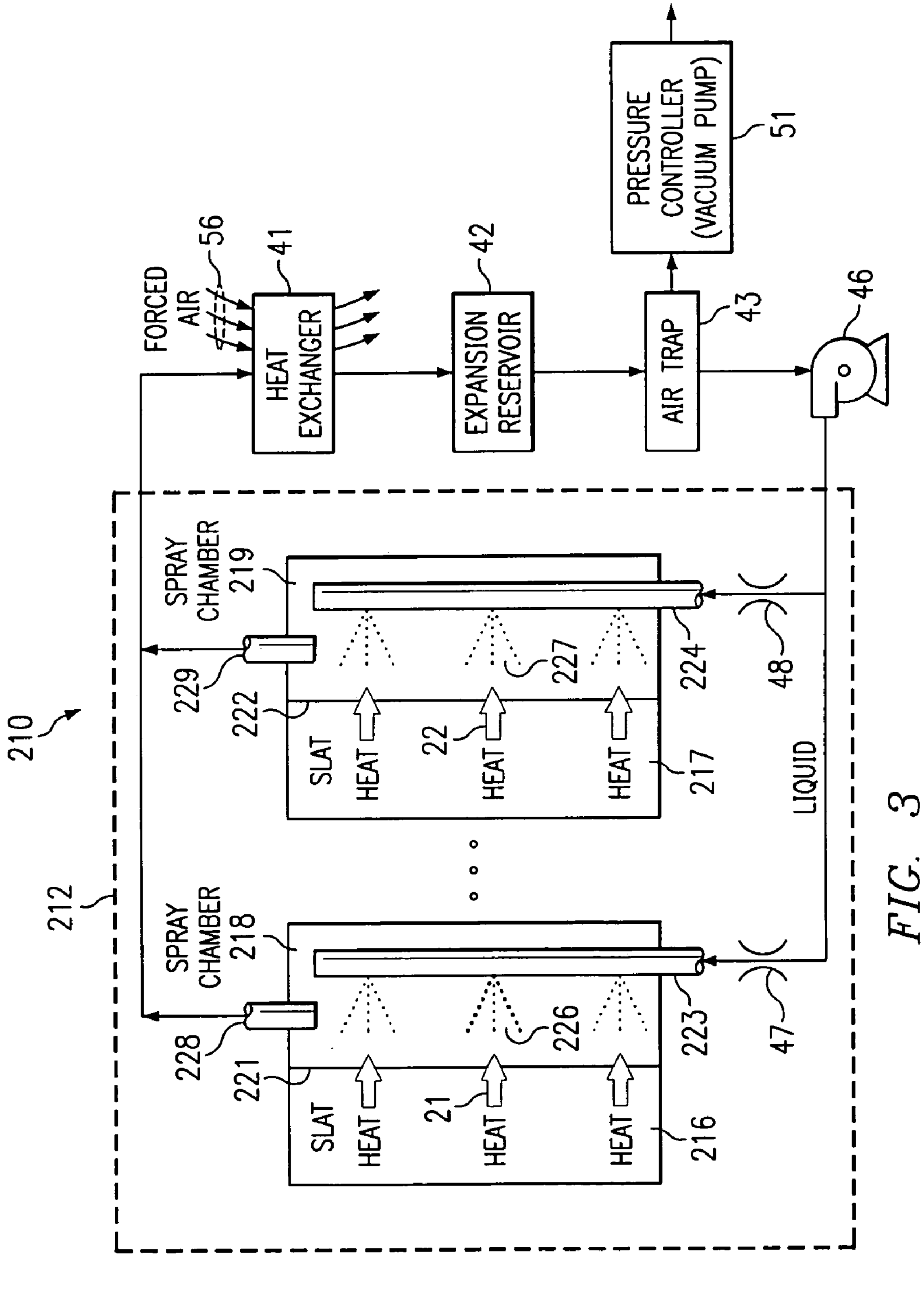
FIG. 3 is a block diagram similar to FIG. 1, but showing an apparatus which is yet another alternative embodiment of the apparatus of FIG. 1.

FIG. 1 is a block diagram of an apparatus 10 which includes a phased array antenna system 12. The antenna system 12 includes a plurality of identical modular parts that are commonly known as slats, two of which are depicted at 16 and 17. A feature of the present invention involves techniques for cooling the slats 16 and 17, so as to remove heat generated by electronic circuitry therein.

The electronic circuitry within the antenna system 12 has a known configuration, and is therefore not illustrated and described here in detail. Instead, the circuitry is described only briefly here, to an extent which facilitates an understanding of the present invention. In particular, the antenna system 12 includes a two-dimensional array of not-illustrated antenna elements, each column of the antenna elements being provided on a respective one of the slats, including the slats 16 and 17. Each slat includes separate and not-illustrated transmit/receive circuitry for each antenna element. It is the transmit/receive circuitry which generates most of the heat that needs to be withdrawn from the slats. The heat generated by the transmit/receive circuitry is shown diagrammatically in FIG. 1, for example by the arrows at 21 and 22.

Each of the slats is configured so that the heat it generates is transferred to a tube 23 or 24 extending through that slat. Alternatively, the tube 23 or 24 could be a channel or passageway extending through the slat, instead of a physically separate tube. A fluid coolant flows through each of the tubes 23 and 24. As discussed later, this fluid coolant is a two-phase coolant, which enters the slat in liquid form. Absorption of heat from the slat causes part or all of the liquid coolant to boil and vaporize, such that some or all of the coolant leaving the slats 16 and 17 is in its vapor phase. This departing coolant then flows successively through a heat exchanger 41, an expansion reservoir 42, an air trap 43, a pump 46, and a respective one of two orifices 47 and 48, in order to again to reach the inlet ends of the tubes 23 and 24. The pump 46 causes the coolant to circulate around the endless loop shown in FIG. 1. In the embodiment of FIG. 1, the pump 46 consumes only about 0.5 kilowatts to 2.0 kilowatts of power.

The orifices 47 and 48 facilitate proper partitioning of the coolant among the respective slats, and also help to create a large pressure drop between the output of the pump 46 and the tubes 23 and 24 in which the coolant vaporizes. It is possible for the orifices 47 and 48 to have the same size, or to have different sizes in order to partition the coolant in a proportional manner which facilitates a desired cooling profile.

Ambient air 56 is caused to flow through the heat exchanger 41, for example by a not-illustrated fan of a known type. Alternatively, if the apparatus 10 was on a ship, the flow 56 could be ambient seawater. The heat exchanger 41 transfers heat from the coolant to the air flow 56. The heat exchanger 41 thus cools the coolant, thereby causing any portion of the coolant which is in the vapor phase to condense back into its liquid phase.

The liquid coolant exiting the heat exchanger 41 is supplied to the expansion reservoir 42. Since fluids typically take up more volume in their vapor phase than in their liquid phase, the expansion reservoir 42 is provided in order to take up the volume of liquid coolant that is displaced when some or all of the coolant in the system changes from its liquid phase to its vapor phase. The amount of the coolant which is in its vapor phase can vary over time, due in part to the fact that the amount of heat being produced by the antenna system 12 will vary over time, as the antenna system operates in various operational modes. From the expansion reservoir 42, liquid coolant flows to the air trap 43.

Theoretically, the cooling loop shown in FIG. 1 should contain only coolant. As a practical matter, however, external air may possibly leak into the cooling loop. When this occurs, air within the coolant circulates with the coolant, until it reaches the air trap 43. The air trap 43 collects and retains the air.

The air trap 43 is operationally coupled to a pressure controller 51, which is effectively a vacuum pump. In the portion of the cooling loop downstream of the orifices 47–48 and upstream of the pump 46, the pressure controller 51 maintains the coolant at a subambient pressure, or in other words a pressure less than the ambient air pressure. Typically, the ambient air pressure will be that of atmospheric air, which at sea level is 14.7 pounds per square inch area (psia). In the event that the air trap 43 happens to collect some air from the cooling loop, the pressure controller 51 can remove this air from the air trap in association with its task of maintaining the coolant at a subambient pressure.

Turning now in more detail to the coolant, one highly efficient technique for removing heat from a surface is to boil and vaporize a liquid which is in contact with the surface. As the liquid vaporizes, it inherently absorbs heat. The amount of heat that can be absorbed per unit volume of a liquid is commonly known as the latent heat of vaporization of the liquid. The higher the latent heat of vaporization, the larger the amount of heat that can be absorbed per unit volume of liquid being vaporized.

The coolant used in the disclosed embodiment of FIG. 1 is water. Water absorbs a substantial amount of heat as it vaporizes, and thus has a very high latent heat of vaporization. However, water boils at a temperature of 100° C. at atmospheric pressure of 14.7 psia. In order to provide suitable cooling for an electronic apparatus such as the phased array antenna system 12, the coolant needs to boil at a temperature of approximately 60° C. When water is subjected to a subambient pressure of about 3 psia, its the boiling temperature decreases to approximately 60° C. Thus, in the embodiment of FIG. 1, the orifices 47 and 48 permit the coolant pressure downstream from them to be substantially less than the coolant pressure between the pump 46 and the orifices 47 and 48. The air trap 43 and the pressure controller 51 maintain the water coolant at a pressure of approximately 3 psia along the portion of the loop which extends from the orifices 47 and 48 to the pump 46, in particular through the tubes 23 and 24, the heat exchanger 41, the expansion reservoir 42, and the air trap 43.

Water flowing from the pump 46 to the orifices 47 and 48 has a temperature of approximately 65° C. to 70° C., and a pressure in the range of approximately 15 psia to 100 psia. After passing through the orifices 47 and 48, the water will still have a temperature of approximately 65° C. to 70° C., but will have a much lower pressure, in the range about 2 psia to 8 psia. Due to this reduced pressure, some or all of the water will boil as it passes through and absorbs heat from the tubes 23 and 24, and some or all of the water will thus vaporize. After exiting the slats, the water vapor (and any remaining liquid water) will still have the reduced pressure of about 2 psia to 8 psia, but will have an increased temperature in the range of approximately 70° C. to 75° C.

When this subambient coolant water reaches the heat exchanger 41, heat will be transferred from the water to the forced air flow 56. The air flow 56 has a temperature less than a specified maximum of 55° C., and typically has an ambient temperature below 40° C. As heat is removed from the water coolant, any portion of the water which is in its vapor phase will condense, such that all of the coolant water will be in liquid form when it exits the heat exchanger 41. This liquid will have a temperature of approximately 65° C. to 70° C., and will still be at the subambient pressure of approximately 2 psia to 8 psia. This liquid coolant will then flow through the expansion reservoir 42 and the air trap 43 to the pump 46. The pump will have the effect of increasing the pressure of the coolant water, to a value in the range of approximately 15 psia to 100 psia, as mentioned earlier.

It will be noted that the embodiment of FIG. 1 operates without any refrigeration system. In the context of high-power electronic circuitry, such as that utilized in the phased array antenna system 12, the absence of a refrigeration system can result in a very significant reduction in the size, weight, and power consumption of the structure provided to cool the antenna system.

The system of FIG. 1 is capable of cooling something from a temperature greater than that of ambient air or seawater to a temperature closer to that of ambient air or seawater. However, in the absence of a refrigeration system, the system of FIG. 1 cannot cool something to a temperature less than that of the ambient air or sea water. Thus, while the disclosed cooling system is very advantageous for certain applications such as cooling the phased array antenna system shown at 12 in FIG. 1, it is not suitable for use in some other applications, such as the typical home or commercial air conditioning system that needs to be able to cool a room to a temperature less than the temperature of ambient air or water.

As mentioned above, the coolant used in the embodiment of FIG. 1 is water. However, it would alternatively be possible to use other coolants, including but not limited to methanol, a fluorinert, a mixture of water and methanol, or a mixture of water and ethylene glycol (WEGL). These alternative coolants each have a latent heat of vaporization less than that of water, which means that a larger volume of coolant must be flowing in order to obtain the same cooling effect that can be obtained with water. As one example, a fluorinert has a latent heat of vaporization which is typically about 5% of the latent heat of vaporization of water. Thus, in order for a fluorinert to achieve the same cooling effect as a given volume or flow rate of water, the volume or flow rate of the fluorinert would have to be approximately 20 times the given volume or flow rate of water.

Despite the fact that these alternative coolants have a lower latent heat of vaporization than water, there are some applications where use of one of these other coolants can be advantageous, depending on various factors, including the amount of heat which needs to be dissipated. As one example, in an application where a pure water coolant may be subjected to low temperatures that might cause it to freeze when not in use, a mixture of water and ethylene glycol could be a more suitable coolant than pure water, even though the mixture has a latent heat of vaporization lower than that of pure water.

FIG. 2 is a block diagram of an apparatus 110 which is an alternative embodiment of the apparatus 10 of FIG. 1. Except for certain specific differences discussed below, the apparatus 110 of FIG. 2 is effectively identical to the apparatus 10 of FIG. 1, and identical parts are identified with the same reference numerals.

The apparatus 110 of FIG. 2 is configured for use in an aircraft, such as a reconnaissance plane or a military fighter jet. The aircraft would have an environmental control unit (ECU) 113, and the ECU 113 would include a refrigeration system of a known type, which is provided within the plane for other purposes, and which causes a known polyalphaolefin (PAO) refrigerant to flow through a loop. In the embodiment of FIG. 1, the heat exchanger 41 transfers heat to a forced flow of air 56. In the embodiment of FIG. 2, a portion of the PAO refrigerant from the refrigeration system of the ECU 113 is routed to the heat exchanger 41. The heat exchanger 41 removes heat from the subambient water which cools the slat, and transfers this heat to the PAO refrigerant.

FIG. 3 is a block diagram of an apparatus 210 which is yet another alternative embodiment of the apparatus 10 of FIG. 1. Except for certain specific differences discussed below, the apparatus 210 of FIG. 3 is effectively identical to the apparatus 10 of FIG. 1, and identical parts are identified with the same reference numerals.

The apparatus 210 of FIG. 3 includes a phased array antenna system 212 having a plurality of slats, two of which are shown at 216 and 217. The apparatus 210 of FIG. 3 differs from the apparatus 10 of FIG. 1 in that the slats 216–217 of FIG. 3 have an internal configuration which is different from the internal configuration of the slats 16–17 of FIG. 1.

More specifically, each of the slats in the antenna system 212 has a spray chamber, for example as shown diagrammatically at 218 and 219 for the slats 216 and 217. One side of each spray chamber is defined by a surface 221 or 222, and heat 21–22 generated by the circuitry within the slats is supplied to the surface 221 or 222 of each slat for dissipation. Incoming coolant enters tubes 223 and 224, which each have therealong a plurality of orifices that are oriented to spray coolant onto the associated surface 221 or 222. The spray is shown diagrammatically in FIG. 3, for example at 226 and 227.

When the coolant spray 226 and 227 contacts the associated surface 221 or 222, it absorbs heat and then boils, and some or all the coolant vaporizes. The resulting vapor, along with any remaining liquid coolant, then exits the spray chamber 218 or 219 through a respective outlet conduit 228 or 229. The pressure controller 51 ensures that coolant in the spray chambers 218 and 219 is at a subambient pressure which reduces the boiling point of the coolant, in the same manner as described above for the embodiment of FIG. 1.

Although the present invention has been disclosed in the context of a phased array antenna system, it will be recognized that it can be utilized in a variety of other contexts, including but not limited to a power converter assembly, or certain types of directed energy weapon (DEW) systems.

The present invention provides a number of technical advantages. One such technical advantage is that, through the use of a two-phase coolant at a subambient pressure, heat-generating structure such as a phased array antenna system can be efficiently cooled. A related advantage is that it is possible to effect cooling in this manner without any refrigeration system, thereby substantially reducing the weight, size and power consumption of the structure which effects cooling. In the context of a state-of-the-art phased array antenna system, the absence of a refrigeration system can reduce the system weight by approximately 200 pounds, and can reduce the system power consumption by 25 to 30 kilowatts, or more. In the absence of a refrigeration system, power consumption for cooling is basically limited to the power which is supplied to the pump in order to circulate the coolant, and the pump consumes only about 0.5 kilowatts to 2.0 kilowatts.

The cooling techniques according to the invention are particularly advantageous in a phased array antenna system, due in part to the use of a two-phase coolant. In particular, it is desirable that all of the circuitry in a phased array antenna system operate at substantially the same temperature, because temperature variations or gradients across the array can introduce unwanted phase shifts into signal components that are being transmitted or received, which in turn degrades the accuracy of the antenna system. The maximum permissible size for such temperature gradients decreases progressively as the antenna is operated at progressively higher frequencies.

In pre-existing systems, which use a single-phase coolant, temperature gradients are common, due in part to the fact that the coolant becomes progressively warmer as it moves across the array and absorbs progressively more heat. In contrast, since the invention uses a two-phase coolant that effects cooling primarily by virtue of the heat absorption which occurs as a result of coolant vaporization, and since vaporization occurs at a very precise and specific temperature for a given coolant pressure, the cooling effect is extremely uniform throughout the phased array antenna system, and is thus highly effective in minimizing temperature gradients.

Although selected embodiments have been illustrated and described in detail, it will be understood that various substitutions and alterations are possible without departing from spirit and scope of the present invention, as defined by the following claims.

What is claimed is:

1. A method for cooling heat-generating structure disposed in an environment having an ambient pressure, comprising the steps of:

providing a fluid coolant;

reducing a pressure of said coolant to a subambient pressure at which said coolant has a boiling temperature less than a temperature of said heat-generating structure;

bringing said coolant at said subambient pressure into thermal communication with said heat-generating structure, so that said coolant boils and vaporizes to thereby absorb heat from said heat-generating structure; and, circulating said coolant through a flow loop while maintaining the pressure of said coolant within a range having an upper bound less than said ambient pressure.

2. The method according to claim 1, including the steps of:

configuring said heat-generating structure to include a passageway having a surface which extends along a length of said passageway;

supplying the heat generated by said heat generating structure to said surface of said passageway along the length thereof; and causing said coolant to flow through said passageway and engage said surface.

3. The method according to claim 1, including the steps of:

configuring said heat-generating structure to include a chamber having a surface;

supplying the heat generated by said heat generating structure to said surface of said chamber; and spraying said coolant onto said surface within said chamber.

4. The method according to claim 1, including the step of selecting for use as said coolant one of water, methanol, a fluorinert, and a mixture of water and ethylene glycol.

5. The method according to claim 1, including the step of configuring said heat-generating structure to include a plurality of sections which each generate heat; and wherein said step of bringing said coolant into thermal communication with said heat-generating structure includes the step of bringing respective portions of said coolant into thermal communication with respective said sections of said heat-generating structure.

6. The method according to claim 5, including the steps of:

providing a plurality of orifices; and causing each said respective portion of said coolant to pass through a respective said orifice before being brought into thermal communication with a respective said section of said heat-generating structure.

7. The method according to claim 6, including the step of configuring said orifices to have respective different sizes in order to cause said portions of said coolant to have respective different volumetric flow rates.

8. The method according to claim 1, including the step of configuring said loop to include a heat exchanger for removing heat from said coolant so as to condense said coolant to a liquid.

9. The method according to claim 8, including the step of causing said heat exchanger to transfer heat from said coolant to a further medium having an ambient temperature which is less than said boiling temperature of said coolant at said subambient pressure.

10. The method according to claim 9, including the step of selecting for use as said medium one of ambient air, ambient water, and a cooling fluid of an aircraft cooling system.

11. The method according to claim 8, including the step of configuring said loop to include a pump for circulating said coolant through said loop.

* * * * *